United States Patent
Ciani

(10) Patent No.: US 7,266,234 B2
(45) Date of Patent: Sep. 4, 2007

(54) METHOD AND DEVICE TO CONTROL THE STRAIGHTNESS AND TORSIONS OF LONG PRODUCTS

(75) Inventor: Lorenzo Ciani, Udine (IT)

(73) Assignee: Danieli Automation SpA, Buttrio (UD) (IT)

( * ) Notice: Subject to any disclaimer, the term of this patent is extended or adjusted under 35 U.S.C. 154(b) by 767 days.

(21) Appl. No.: 10/765,796

(22) Filed: Jan. 27, 2004

(65) Prior Publication Data
US 2004/0184650 A1 Sep. 23, 2004

(30) Foreign Application Priority Data
Jan. 28, 2003 (IT) .......................... UD2003A0019

(51) Int. Cl.
*G06K 9/00* (2006.01)

(52) U.S. Cl. .......................... 382/141; 702/35; 702/40; 702/84

(58) Field of Classification Search ................ 348/129, 348/130, 134; 356/388, 390–398, 433, 488, 356/954; 382/141, 219, 220; 702/35, 40, 702/84, 159
See application file for complete search history.

(56) References Cited

U.S. PATENT DOCUMENTS
2001/0015104 A1 * 8/2001 Wooh .......................... 73/598

FOREIGN PATENT DOCUMENTS
| DE | 197 21 915 C1 | 12/1998 |
| DE | 197 40 614 A1 | 3/1999 |
| JP | 57061907 | 4/1982 |

* cited by examiner

*Primary Examiner*—Matthew C. Bella
*Assistant Examiner*—G. F. Cunningham
(74) *Attorney, Agent, or Firm*—Akin Gump Strauss Hauer & Feld LLP

(57) ABSTRACT

Device and method to control the straightness and torsions of a long product (11), comprising at least two profile-detection devices (12a, 12b, 12c), each presenting a visual field (13) that includes a perimeter segment (18a, 18b, 18c) of the section of the product (11). The detection devices are aligned along the product (11) and are oriented so as to detect homologous perimeter segments (18a, 18b, 18c) located on different planes. The device also comprises a command unit which receives and compares with each other the section images detected at the same instant by the detection devices (12a, 12b, 12c) and determines, according to this comparison, the lack of straightness and/or the presence of torsions in the product (11).

13 Claims, 3 Drawing Sheets

METHOD AND DEVICE TO CONTROL THE STRAIGHTNESS AND TORSIONS OF LONG PRODUCTS

FIELD OF THE INVENTION

The present invention concerns a method and a device to control and measure in line the straightness and the presence or absence of torsions in a long product, such as for example a metal product emerging from rolling or drawing processes.

The invention is applied, advantageously but not exclusively, in the field of quality control of long products in the iron and steel industry, such as bars, round pieces, I bars, T bars, V bars or profiles of any other desired geometric shape. To be more exact, the invention is advantageously applied in the quality and processing control in order to determine, before the cold straightening step, the straightness and/or presence of torsions in profiles for rails, linear guides or for other similar applications.

Although the following description will mainly refer to the application indicated above, it is clear that the invention can be extended substantially to any application wherein it is necessary to verify the straightness of long products in the form of bars, rods, strips, wires and profiles of substantially any section and material.

BACKGROUND OF THE INVENTION

It is known, particularly in the field of iron and steel production, that it is necessary to perform a quality control on the straightness and the presence or absence of longitudinal torsions in long profiles emerging from rolling and/or drawing processes. Normally, this control is made in line on the profile advancing on a rollerway, a belt or other suitable means, by means of a plurality of detection means arranged one after the other.

One known method to perform this control provides to use a series of feeler pins separated from each other along the profile and located in contact with homologous segments of the perimeter of the profile. The feeler pins are provided to determine defects in the straightness by detecting a lack of alignment between the homologous points and possibly measuring the entity of the variation in order to signal the presence of defects beyond an allowed tolerance limit.

However, known systems are not able to guarantee totally reliable results since they cannot discriminate if a possible variation detected is due to a defect in straightness and/or to the presence of torsions along the profile, or to an unexpected displacement of the profile with respect to the nominal position of advance. In fact, if the profile is displaced even only by a little from the nominal position with respect to which the feeler pins have been located and set, this displacement can cause reading errors, leading to a mistaken evaluation of the quality of the profile.

The non-identification of profiles that are not perfectly straight can lead to serious consequences, particularly in the production of rails for tracks, linear guides or other similar products.

Detection devices that detect profiles without contact are also known, which use laser emitters suitably oriented and combined with a filming device, such as a TV camera, in order to acquire the shape of a perimeter segment of a product. By using two, three or more of these devices, arranged to make the detection on a same plane and each one oriented so as to cover, with its visual field, a specific perimeter segment which is at least partly contiguous to the segments covered by the other devices, it is possible to reconstruct the shape of profiles with extreme accuracy, even those with a complex section. An example of such devices is shown in JP-A-57-061907.

Such devices are used, for example, in the field of iron and steel production in order to control the shape and measure the section sizes of profiles emerging from rolling and/or drawing processes, and to verify that they conform to the nominal sections and/or as laid down by specifications. Such known devices are not able however to make controls or measurements of straightness or to verify the possible presence of torsions along the profiles.

DE-C-19721915 shows another example of an optical detector for steel profiles usable as rails.

The Applicant has devised, tested and embodied the present invention to overcome the shortcomings of the state of the art and to obtain other advantages.

Purpose of the invention is to achieve a device and a method able to detect and/or measure with extreme reliability the straightness of a long product, having constant shape, and size in length, and to verify the presence or absence of longitudinal torsions along this product, in a manner that substantially cannot be influenced by variations in the position of the product to be controlled with respect to its nominal position.

SUMMARY OF THE INVENTION

The present invention is set forth and characterized in the main claims, while the dependent claims describe other innovative characteristics of the invention.

According to the invention, at least two detection devices to detect at least a perimeter segment of the section of the product to be controlled are arranged in different positions and aligned on the length of such product, at a known distance from each other. These devices are located in a position adjacent to the product to be examined, so as to be able to detect perimeter segments of the product located on different planes, parallel to each other and substantially, but not necessarily, orthogonal to the direction of longitudinal development of the product.

In order to make the observation, these devices are oriented in such a manner that the respective visual fields include homologous segments of the sections of the product in correspondence with the respective reading planes. In other words, the product is sectioned, with a direction substantially orthogonal to its longitudinal axis, according to a plurality of parallel planes each one corresponding to the position of the respective detection device.

Each of such devices is suitable to detect, and possibly memorize and pre-process by means of a command and processing unit that governs and controls the functioning thereof, the profile of the section determined by the intersection between its reading plane and the product to be controlled.

According to the invention, these at least two detection devices are activated, at the same moment, to detect and memorize the image of the shape of a relative perimeter segment of the section of the product. The memorized images are then compared by the command unit, for example by means of virtual superimposition, after the appropriate processing has been carried out in order to make the reference of the reciprocal positions uniform and coherent.

The comparison of these images allows to detect possible defects due to a lack of straightness or to the presence of longitudinal torsions on the product in transit.

The method according to the invention may provide, in a preferential embodiment, a preliminary step of setting the detection devices wherein a sample product, without either torsions or flections and advantageously having the same profile of the product to be controlled, is subjected to measurement by these devices in order to obtain therefrom a model image that is then compared with the image detected of the product.

According to a variant, the detection devices, by means of the command unit, are connected to a data base wherein the images relating to a plurality of sample profiles are memorized. At the start of the control procedure, the command unit selects the sample profile corresponding to the profile of the product to be controlled and uses this sample as a model for the comparison with the real images detected in line.

As will be seen in more detail hereafter, a lack of straightness in the product is detected by comparing at least three images taken by respective profile measurement devices, while the presence or absence of torsions is detected by means of a comparison between at least two of these images.

With the invention it is possible to achieve an extremely quick and reliable detection, performed in line with the product stationary or moving and without entailing downtimes or complexities in the production process.

A further advantageous option of the present invention involves the possibility of reconstructing the whole profile of the bar by means of such detections, and of carrying out the desired measurements and evaluations on the reconstructed profile.

The reconstruction of the profile of the bar is obtained by detecting in sequence a plurality of pairs, or threesomes, of points by the above detection devices during the progressive relative movement of the bar and the detectors, and by a subsequent interpolation of said pairs or threesomes of homologous points, using known methods. It should be noted that to guarantee a reconstruction that approaches the actual profile of the bar effectively, the shift or translation of the pairs or threesomes of homologous points must be of a much lower value than the value of the distance between the points of the same pair or threesome.

The possibility of reconstructing the profile of the bar is particularly advantageous since it allows to effect the desired checks on the straightness and presence or absence of torsions on the virtual profile of the bar as reconstructed, with the advantage, for example, of avoiding mechanical constraints connected to the systems that move and transport said bar.

BRIEF DESCRIPTION OF THE DRAWINGS

These and other characteristics of the present invention will become apparent from the following description of a preferential form of embodiment, given as a non-restrictive example, with reference to the attached drawings wherein.

DETAILED DESCRIPTION OF THE DRAWINGS

Figure 1:
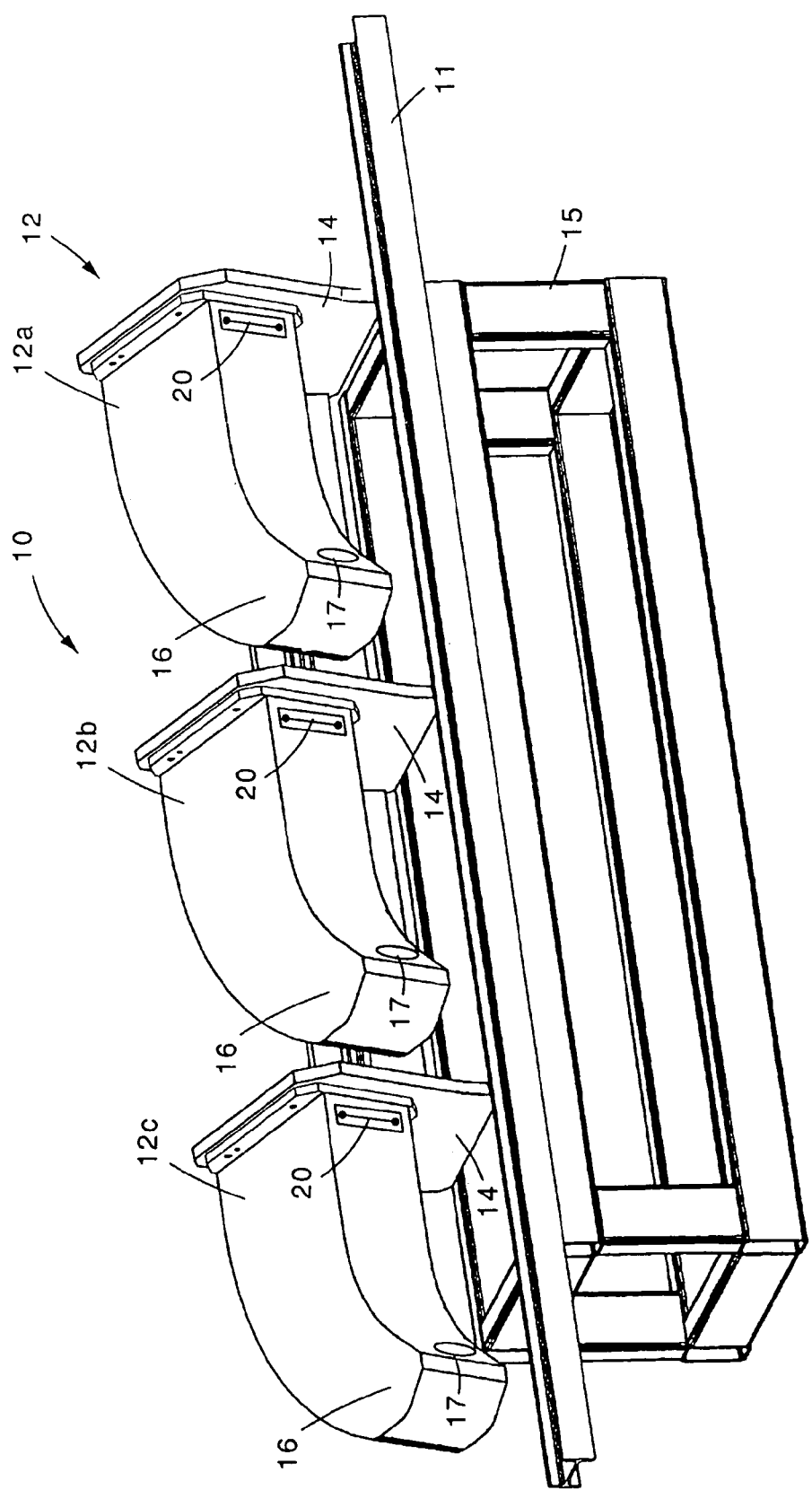
FIG. 1 is a perspective view of the device according to the invention comprising three profile detection devices.
Figure 2:
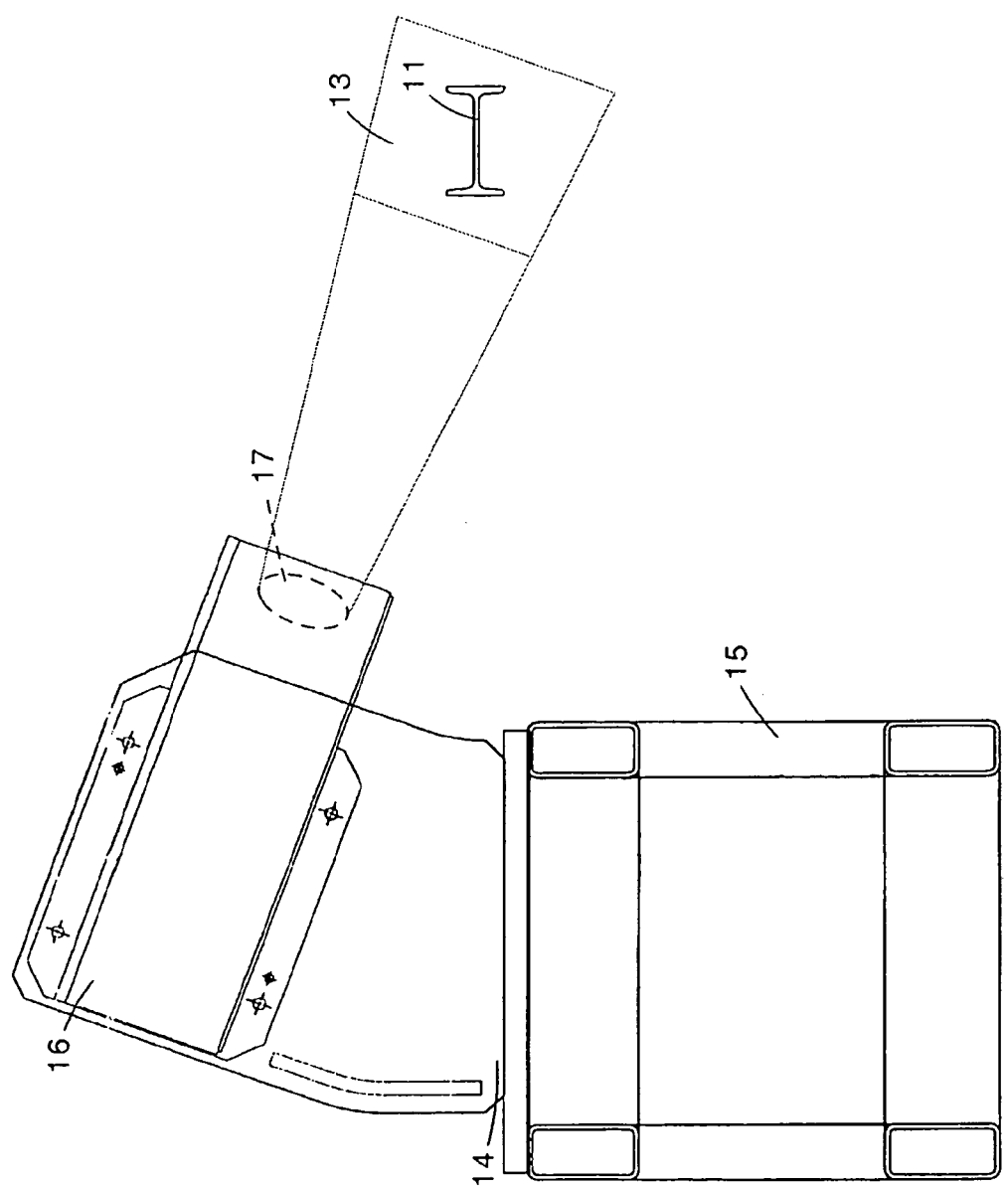
FIG. 2 is a schematic view of a transverse section of the device in FIG. 1.

With reference to the attached figures, a device to control the straightness and torsions of long products 11, in this case an "I" section metal profile, is indicated in its entirety by the reference number 10.

Such device 10 comprises, in this case, three optical profile-detection devices 12, respectively 12a, 12b, 12c, identical to each other and aligned on the length of the product 11. Each of the devices 12 has a relative visual field 13 including at least a perimeter segment of the section of the product 11.

Each optical device 12 comprises a supporting plate 14, rigidly attached to a base 15, on which an extension 16 is mounted oriented towards the product 11 to be controlled. On such extension 16 an image detection device is positioned, such as a TV camera 17; on the plane of the plate 14 an emitter 20 of a laser beam 19 is mounted. The laser beam 19 lies on a plane parallel to the plate 14 and hits the product 11 during its transit, substantially defining the reading plane of each of the devices 12. The respective reading planes of the devices 12 are parallel to each other and substantially orthogonal to the longitudinal development of the product 11 to be controlled.

The product 11 can be stationary or can advance in the direction of longitudinal development, driven by a rollerway, a belt or other suitable type of conveyor means.

Figure 3:
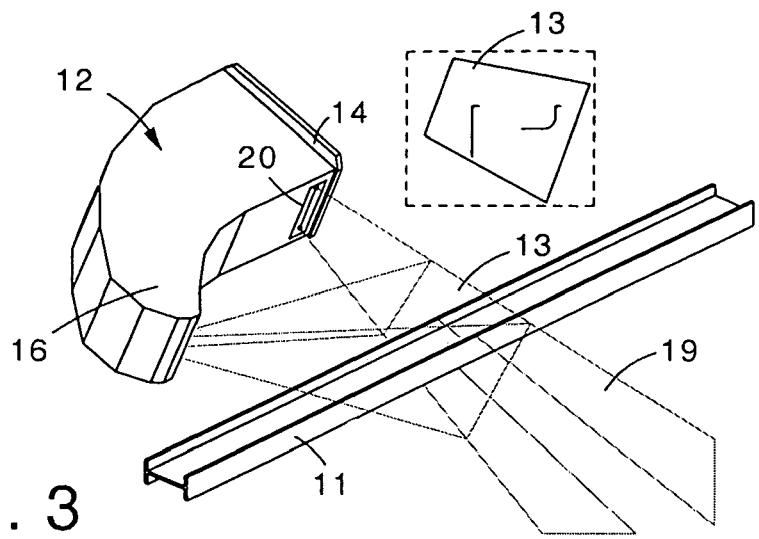
FIG. 3 shows a functioning diagram of a profile detection device used in the present invention.

Each of the detection devices 12 is suitable to detect the profile of a specific segment of section of the product 11, such profile being detected at the same moment, on the various different planes, parallel to each other and longitudinally aligned. To be more exact, as can be seen in the detail in FIG. 3, each device 12 detects the profile of a perimeter segment corresponding to the intersection between the reading plane defined by the laser beam 19 and the product 11 which is located at least momentarily in the visual field 13.

The images filmed and memorized by each of the devices 12 are first made coherent, by making uniform the references of the main axes, or of the baricenter, of the detected section, and then compared with each other.

Figure 4A:
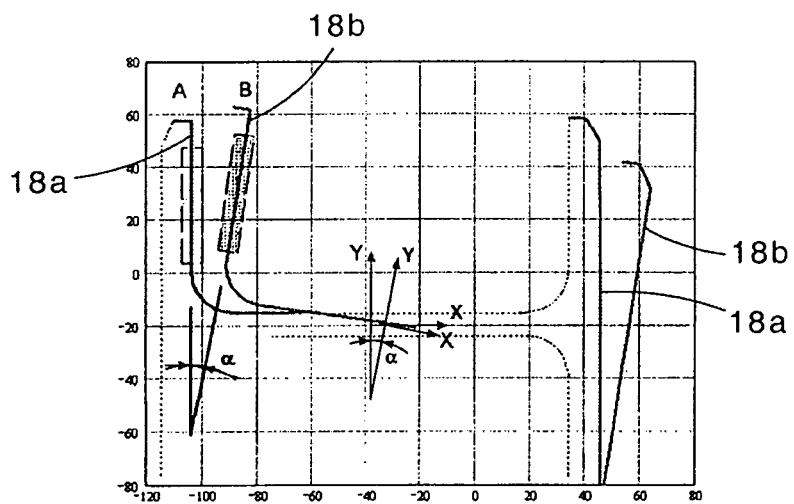
FIGS. 4a and 4b show two graphs relating respectively to a torsion measurement and to a straightness measurement performed with the present invention.
Figure 4B:
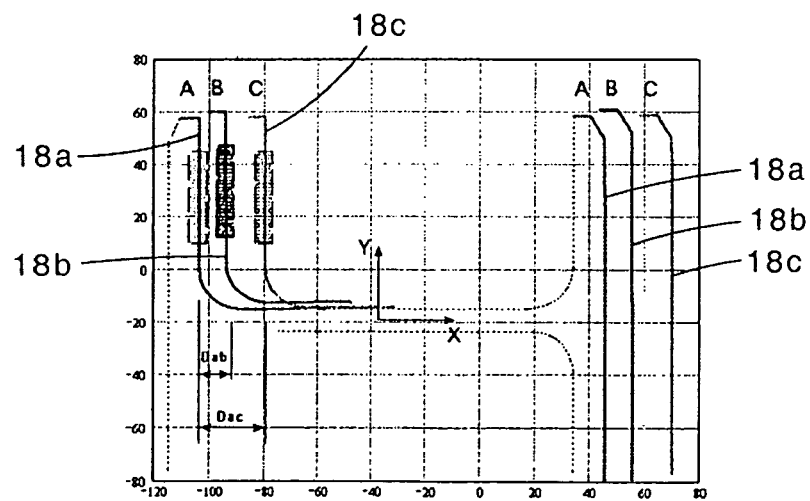

FIGS. 4a and 4b show respectively the cases relating to the torsion measurement and the straightness measurement in the product 11.

The torsion is measured by comparing the section data detected by at least two devices 12, for example the devices 12a and 12b. After having translated one of the two sections with respect to the other until the respective baricenters coincide, the relative position of the main reference axes X and Y of the sections detected is considered and compared. The relative rotation, if any, of the two aforesaid reference systems provides the indication of the longitudinal torsion between the two points of the product 11 corresponding to the positions of the two detection devices 12a, 12b.

In the case shown here, the measurement detected by the two devices 12a and 12b has identified the presence of an angle of torsion "α", the value of which can be quantified by means of appropriate algorithms.

To measure the straightness it is necessary to use at least three detection devices 12 and compare and superimpose the relative images (FIG. 4b). As can be seen in the figure, the three segments of section, identified as 18a, 18b and 18c, are represented on a Cartesian plane with respect to a common reference on the axes X and Y, and this allows to obtain an immediate visual confirmation with regard to the lack of straightness of the product 11.

In this case too, appropriate calculation algorithms allow to quantify the variation from the straightness, thus allowing to make the due corrections in the subsequent straightening step.

With reference to the figure, an indication of the lack of straightness, in the hypothesis that the reading planes of the devices 12a, 12b and 12c are equidistant, is the fact that DAB is different from $D_{AC}/2$; the entity of the difference between these two values provides a measurement of the lack of straightness.

Both in measuring the torsion and also in measuring the lack of straightness, according to a variant, the invention provides to use calculation and filter algorithms in order to identify and separate possible contributions to the detected entity of flexion or torsion determined by external factors.

To be more exact, these contributions can be determined by mechanical actions, for example having a direction transverse to the direction of feed, applied on the product 11 by the feed and dragging members thereof in the presence of a product having high elastic characteristics.

These calculation and filter algorithms are based on identifying the typical frequencies of resonance of the product 11 being measured and on the subsequent elimination, from the values of non-straightness and torsion detected with respect to time, of such contributions pertaining to the elastic oscillations of the product 11 caused by external stresses.

In an advantageous evolution of the invention, numerous detections performed by the three detection devices 12a, 12b, 12c, sequentially and at close temporal intervals so that the shift or translation value between homologous points is much less than the distance between the points of a same pair or threesome, can be used to reconstruct the entire profile of the product 11. This reconstruction of the profile allows, for example, to evaluate the straightness and/or the presence or absence of torsions, without constraints connected to the mechanical systems that transport and feed the product 11 itself.

Modifications and variants may be made to the present invention, which remain within the field and scope thereof. For example, the structure and operating characteristics of the detection devices 12 could be different from those shown here merely as an example. It is obvious that any detection device of similar or equivalent section could be employed with the same function as the devices 12.

The invention claimed is:

1. Device to control the straightness and torsions of a long product (11), characterized in that it comprises at least two profile-detection optical devices (12a, 12b, 12c), each presenting a visual field (13) including at least a perimeter segment (18a, 18b, 18c) of the section of said product (11), said at least two devices (12a, 12b, 12c) being arranged adjacent and aligned along said product (11) and being oriented so as to detect homologous perimeter segments (18a, 18b, 18c) located on different planes, the device also comprising a command unit able to receive and compare with each other the section images detected at the same instant by said detection devices (12a, 12b, 12c) and to determine, according to said comparison, the lack of straightness and/or the presence of torsions in said product (11).

2. Device as in claim 1, characterized in that in order to detect the lack of straightness in said long product (11) it comprises at least three of said devices (12a, 12b, 12c).

3. Device as in claim 1, characterized in that said at least two devices (12a, 12b, 12c) are suitable to detect the profile on respective planes, substantially parallel to each other and substantially orthogonal to the direction of longitudinal development of the product (11) and at a reciprocal known distance.

4. Device as in claim 1, characterized in that each of said devices (12a, 12b, 12c) comprises at least an emitter element (20) to emit a beam of light that intercepts at least part of the section of the product (11) and at least an image detection means (17).

5. Device as in claim 4, characterized in that said beam of light is a laser beam (19).

6. Device as in claim 4, characterized in that said image detection means is a TV camera (17).

7. Method to control the straightness and torsions of a long product (11), characterized in that it provides a first step wherein at least two profile-detection optical devices (12a, 12b, 12c), each presenting a visual field (13) including at least a perimeter segment (18a, 18b, 18c) of the section of said product (11), are arranged in a position adjacent and aligned along said product (11) in order to detect homologous perimeter segments (18a, 18b, 18c) lying on respective different planes and substantially orthogonal to the longitudinal development of the product (11), a second step wherein said at least two detection devices (12a, 12b, 12c) are simultaneously activated in order to detect a relative perimeter segment (18a, 18b, 18c) of said section, and a third comparison step wherein the images relating to said perimeter segments (18a, 18b, 18c) are compared with each other in order to determine the lack of straightness and/or the presence of torsions in said product (11).

8. Method as in claim 7, characterized in that before the comparison step, it provides a step wherein the images relating to said perimeter segments (18a, 18b, 18c) are at least processed in order to be positioned all with respect to a common spatial reference.

9. Method as in claim 7, characterized in that it provides a preliminary step of setting said detection devices (12a, 12b, 12c) wherein a sample product, without either torsion or flexion, is subjected to measurement by said devices (12a, 12b, 12c) in order to make therefrom a model image to be compared with the image detected of the product (11).

10. Method as in claim 7, characterized in that it provides to memorize, in a data base, images relating to a plurality of sample profiles, and to select, from said data base, at the start of the control step, a sample profile corresponding to the profile of said product (11) in order to use said sample as a model during the comparison step with the images detected.

11. Method as in claim 7, characterized in that it provides a step of identifying and separating, from the detected entity of flexion or torsion, contributions determined by mechanical actions applied on a product (11) having high elastic characteristics, said identification and separation step being based on the identification of typical frequencies of resonance of said product (11) and on the subsequent elimination of said contributions pertaining to elastic oscillations of the product (11).

12. Method as in claim 7, characterized in that it provides to reconstruct the entire profile of said product (11) using a plurality of sequential detections performed by said detection devices (12a, 12b, 12c) and interpolating homologous points relating to said sequential detections between each other.

13. Method as in claim 12, characterized in that it provides that the determination of the lack of straightness or of the presence of torsions in said product (11) is performed on said profile of the reconstructed product (11).

* * * * *